Feb. 19, 1929.

F. G. KELLY, JR 1,702,444

ELECTRICAL MEASURING INSTRUMENT

Filed April 22, 1927

WITNESSES:
R. S. Williams
B. R. King

INVENTOR
Fred G. Kelly Jr.
BY
Wesley G. Carr
ATTORNEY

Patented Feb. 19, 1929.

1,702,444

UNITED STATES PATENT OFFICE.

FRED G. KELLY, JR., OF ENSLEY, ALABAMA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed April 22, 1927. Serial No. 185,683.

My invention relates to electrical measuring instruments and more particularly to measuring instruments of the indicating type.

My invention has for an object to provide means for indicating the maximum effective value of an electrical quantity, such as current, voltage or power, subjected to interruptions.

Another object of my invention is to provide an instrument of the above-indicated character that shall be accurate in its operation and relatively cheap to manufacture.

These and other useful and desirable objects will be explained more fully in the following description.

If an ordinary indicating instrument is electrically connected in circuit relation to a circuit having a periodically interrupted current flow, the pointer will tend to swing between a maximum value and zero in accordance with the "on" and "off" period of the current flow. The pointer does not oscillate between a value representing the true maximum value of current traversing the interrupted circuit but tends to swing past such a point an amount that is dependent upon the magnitude of inertia of the movable element, the torque exerted thereon, the duration of the applied impulses, the frequency of the current, and the amount of "damping" applied to the movable element in its gyrations between zero and its maximum swing. By virtue of this fact, it is impossible to obtain a correct reading or indication of the maximum effective value of current or other electrical characteristic traversing the circuit.

In practicing my invention, I provide means including an adjustable back stop for the pointer mounted on the casing of the instrument for decreasing the amplitude of the oscillations of the pointer until the torque actuating the pointer is balanced by the torque of the resisting spring, which point of rest will indicate on the scale the true maximum effective value of current traversing the circuit.

My invention will be more readily understood if the accompanying drawings are considered in connection with the following description.

Figure 1:
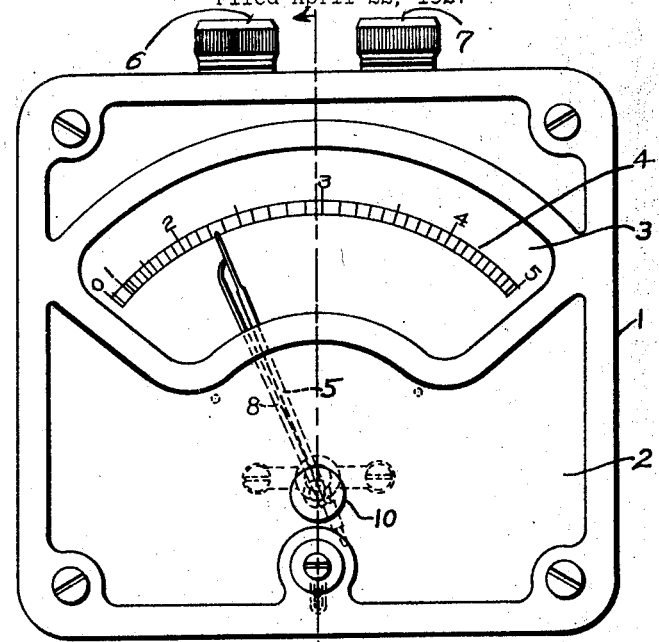
Figure 1 is a view, in elevation, of an electrical measuring instrument embodying my invention.
Figure 2:
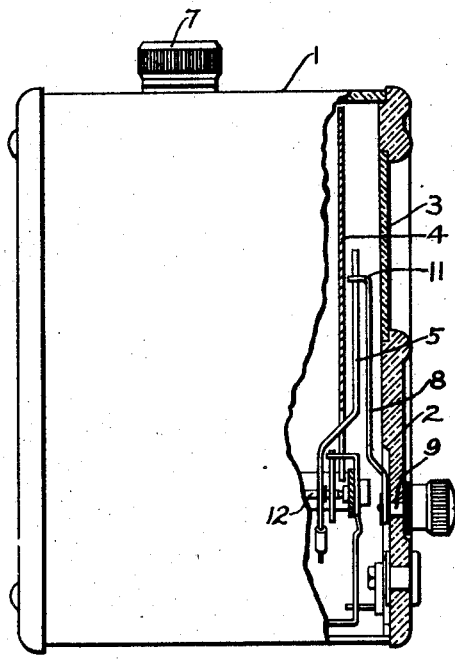
Fig. 2 is a view, partially in side elevation and partially in section, through the line 11—11 of the instrument shown in Fig. 1.

My electrical measuring instrument comprises a casing 1 provided with a cover 2, having a transparent portion 3, behind which is mounted a scale 4. A pointer 5 is adapted to move over the scale 4, in the usual manner, to indicate a characteristic of an electrical quantity in the circuit to which terminals 6 and 7 may be connected. An arm 8 is secured to a connecting member 9 that is provided with a thumb knob 10 and is mounted in the cover 2. The arm 8 is provided with a bent portion 11 to engage, and prevent backward motion of, the pointer 5. By manually turning the knob 10, the backward motion of the pointer 5 may be limited to stop at that point on the scale 4 at which the torque of the pointer is balanced by the torque of its resisting spring (not shown).

The pointer 5 is turned by an armature 12 that is actuated by the elements of the instrument in a well known manner.

For purposes of clearness, I will describe the operation of the instrument as if current were the electrical quantity to be measured. Also, an alternating current will be indicated, although my invention is applicable to direct current as well.

Figure 3:
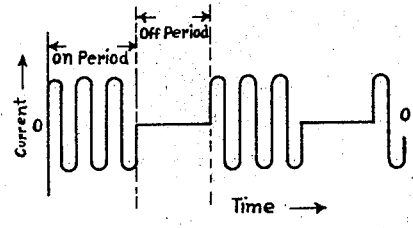
Fig. 3 is a graph of a periodically interrupted alternating current.

In Fig. 3, a pulsating current is plotted against time, and the "on" period is shown by the frequency waves and the "off" period as a straight line through zero, showing that current traverses the instrument for a period, comes to zero for a period and the cycle is repeated indefinitely.

This pulsating alternating-current wave affects the movement of the instrument in three ways. First, each alternation of current sets up a torque in the movement. Inasmuch as the inertia of the movement prevents it from returning to zero for each alternation of current that would equal 120 on a 60 cycle current, the movement assumes a position of average torque for each "on" period of current. In addition to this, the average torque is periodically interrupted, resulting in a "periodically interrupted average torque."

Figure 4:
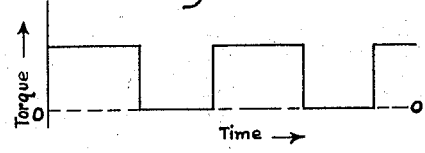
Fig. 4 is a graph of the average torque that would be developed in an indicating instrument if the current shown in Fig. 3 traversed its actuating coils.

Fig. 4 shows a graph of the average torque that tends to actuate the pointer with such a pulsating current. In the current "on" period, the average torque is a constant maximum value, and, in the current "off" period, the average torque returns to zero. During the "on" period of current, the pointer would swing toward a position indicating such a maximum average torque, but, during the "off" period, the pointer would return to zero. If the back stop 11 were omitted, the pointer 5 would oscillate back and forth between zero and a maximum value.

By advancing the back stop 11 behind the pointer 5, the latter is prevented from returning to a position behind the back stop. As the back stop 11 is turned nearer and nearer to a position representing the value of maximum actuating force, or the position of maximum torque, the allowable angle of oscillation of the pointer becomes smaller and smaller. When the back stop is advanced far enough to hold the pointer in the position of maximum torque, the counterspring torque is balanced by the maximum electrical torque and the pointer ceases to oscillate. When the pointer has been critically adjusted to such position of zero oscillation by means of the back stop, a value of current is indicated that represents the true effective value of current during the "on" period of the periodically interrupted current flow.

The position of the back stop provides a distinct dividing line between an oscillating condition and a nonoscillating condition of the pointer that furnishes a highly desirable means for obtaining a definite reading of the meter.

As mentioned above, my invention is not only applicable for reading the maximum effective value of current traversing an alternating-current or direct-current electrical circuit having a periodically interrupted current flow, but is also applicable for measuring any other electrical quantity, such as voltage, or power.

While I have shown my invention in a particular application, I do not wish to be so limited but desire that all modifications to be made therein shall be included within the scope of the appended claims.

I claim as my invention:

1. In an electrical instrument, the combination with a casing and a pointer adapted to oscillate with interruptions of current flow in an electric circuit, of an adjustable stop mounted on the said casing, and constituting means whereby the amplitude of the oscillations of the pointer may be decreased to zero to indicate the maximum effective value of an electrical quantity of the said circuit.

2. In an electrical instrument, the combination with a casing and a pointer adapted to oscillate with interruptions of current flow in an electric circuit, of an adjustable stop mounted on the said casing and constituting means whereby the amplitude of the oscillations of the pointer may be decreased to zero to indicate the maximum effective value of current traversing the said circuit.

3. In an electrical instrument, the combination with a supporting structure and a pointer adapted to oscillate with interruptions of current flow in an electric circuit, of an adjustable stop mounted on said structure, and constituting means whereby the amplitude of the oscillations of the pointer may be decreased to zero to indicate the maximum effective value of an electrical quantity of said circuit.

In testimony whereof, I have hereunto subscribed my name this 15th day of April, 1927.

FRED G. KELLY, Jr.